US012728570B2

(12) United States Patent
Hsu et al.

(10) Patent No.: US 12,728,570 B2
(45) Date of Patent: Sep. 8, 2026

(54) METHOD FOR MAKING FOAMED SHOE MATERIAL

(71) Applicant: CCILU INTERNATIONAL INC., Taichung City (TW)

(72) Inventors: Chih-Jen Hsu, Taichung City (TW); Chia-Ming Hsu, Taichung City (TW); Yi-Ju Huang, Taichung City (TW)

(73) Assignee: CCILU International Inc., Taichung City (TW)

( * ) Notice: Subject to any disclaimer, the term of this patent is extended or adjusted under 35 U.S.C. 154(b) by 555 days.

(21) Appl. No.: 18/350,463

(22) Filed: Jul. 11, 2023

(65) Prior Publication Data

US 2023/0347553 A1 Nov. 2, 2023

Related U.S. Application Data

(63) Continuation-in-part of application No. 16/987,219, filed on Aug. 6, 2020, now abandoned.

(51) Int. Cl.

| | |
|---|---|
| ***B29C 41/00*** | (2006.01) |
| ***B29B 9/04*** | (2006.01) |
| ***B29B 9/12*** | (2006.01) |
| ***B29K 23/00*** | (2006.01) |
| ***B29K 67/00*** | (2006.01) |
| ***B29K 105/26*** | (2006.01) |
| ***B29L 31/50*** | (2006.01) |

(52) U.S. Cl.

CPC .............. *B29C 41/003* (2013.01); *B29B 9/04* (2013.01); *B29B 9/12* (2013.01); *B29K 2023/083* (2013.01); *B29K 2067/003* (2013.01); *B29K 2105/26* (2013.01); *B29L 2031/504* (2013.01)

(58) Field of Classification Search
None
See application file for complete search history.

(56) References Cited

FOREIGN PATENT DOCUMENTS

| | | | | | |
|---|---|---|---|---|---|
| CN | 102329478 | A | * | 1/2012 | ............. B29C 48/04 |
| CN | 110698806 | A | * | 1/2020 | .............. C08J 9/103 |
| EP | 4183832 | A1 | * | 5/2023 | .......... C08L 23/0853 |
| WO | WO-2022011542 | A1 | * | 1/2022 | .......... C08L 23/0853 |

OTHER PUBLICATIONS

CN102329478A, English machine language prepared Jan. 20, 2026. (Year: 2026).*

CN110698806 English machine translation, prepared Jan. 30, 2026. (Year: 2026).*

* cited by examiner

*Primary Examiner* — Christopher M Rodd
(74) *Attorney, Agent, or Firm* — Wang Law Firm, Inc.

(57) ABSTRACT

A method for making foamed shoe materials includes mixing r-PET and EVA with a compatibilizer for melt modification, a new polymer alloy is formed. The polymer alloy is then extruded into strips with an screw extruder under a temperature of 160° C. to 245° C. and an average shear rate of 100/sec to 300/sec, and at an extrusion rate of 100 kg/hr to 250 kg/hr. Simultaneously, the temperature of the screw in the extrusion process is controlled to rise from 160° C. to 245° C., then decrease to less than 240° C., so as to produce composite material masterbatches with good compatibility between recycled PET and EVA, which are used to produce foamed shoe materials, thus achieving the purpose of reusing recycled PET, reducing carbon emissions, and protecting the environment. Furthermore, it reduces the demand for fresh PET materials, thereby reducing the demand for petrochemical raw materials.

11 Claims, No Drawings

METHOD FOR MAKING FOAMED SHOE MATERIAL

CROSS REFERENCE TO RELATED APPLICATION

This application is a continuation in part of U.S. patent application Ser. No. 16/987,219, which claims the earlier filing date of Aug. 6, 2020, the entire specification of which is incorporated herein by reference.

BACKGROUND

Field of the Invention

The present invention relates to the field of polymer composite material, and more particularly to a method for making foamed shoe material made from recycled PET.

Description of Related Art

The ubiquitous PET bottles in daily life are mainly made of polyethylene terephthalate (PET). PET has excellent mechanical properties, chemical stability and transparency, so it is widely used in manufacturing beverage bottles, food containers and other packaging materials, and more widely used in fiber manufacturing, film manufacturing and other fields.

In recent years, with the increasing emphasis on environmental protection, the recycling and reuse of PET has become a hot research topic. Especially for PET used in beverage bottles, due to its large usage amount and recycling value, recycling has become a trend. However, recycled PET may encounter some technical difficulties during the processing, such as a decrease in melt viscosity and thermal stability, which will affect the processing performance of recycled PET and the quality of the final product.

Ethylene vinyl acetate (EVA) is a polymer material with good elasticity and wear resistance, widely used in the sole manufacturing of sports and leisure shoes. However, due to the differences in molecular structure and physical properties between EVA and PET, direct mixing of the two is not easy to form a homogeneous blend, which poses a significant challenge for the application of combining EVA and PET.

Therefore, it is necessary to provide a preparation method for foamed shoe materials that can effectively combine EVA with recycled PET.

SUMMARY

To overcome the above technical problems, the objective of the present invention is to provide a method for making foamed shoe materials. By mixing recycled PET (hereinafter referred to as r-PET) and EVA with a compatibilizer for melt modification, a new polymer alloy is formed. Then, by utilizing a screw extruder, the screw is controlled to gradually increase the temperature from 160° C. to 245° C. during the extrusion process of the polymer alloy, and then the temperature is lowered to below 240° C., so as to produce composite material masterbatches with good compatibility between recycled PET and EVA, which are used to produce foamed shoe materials, thus achieving the purpose of reusing recycled PET, reducing carbon emissions, and protecting the environment. Furthermore, it also reduces the demand for fresh PET materials, thereby reducing the demand for petrochemical raw materials.

To achieve the above objective, a method for making foamed shoe material provided by the invention comprises:

step of picking material: taking a total weight of materials as 100 wt %, provide 25 wt % to 65 wt % recycled polyethylene terephthalate (r-PET), 30 wt % to 70 wt % ethylene vinyl acetate copolymer (EVA), and 2 wt % to 10 wt % compatibilizer; wherein the r-PET is a recycled material made from recycled polyethylene terephthalate (PET) bottles, and the compatibilizer is a polymer material or a grafted polymer material with epoxy content ranging from 3 mol % to 16 mol %;

step of melting: using a weightless metering system, EVA, epoxidized EVA, and PET are proportionally and respectively fed to form a polymer alloy, extruding, by a twin-screw extruder at a temperature of 160° C. to 245° C. and an average shear rate of 100/sec to 300/sec, the polymer alloy into strips at a rate of 100 kg/hr to 250 kg/hr, while controlling the screw within the aforementioned temperature range during the extruding process of the polymer alloy, starting from the feeding process, and heating the polymer alloy from temperature of 160° C. to 245° C., and then cooling it down to less than 240° C. during the process of extruding the polymer alloy with the twin-screw extruder;

step of semi-finished product strip drawing: controlling the twin-screw extruder to draw out the polymer alloy strip that has been extruded into strips, and guide the polymer alloy strips to cool through a water channel;

step of cutting and granulation: controlling the twin-screw extruder to cut the cooled polymer alloy strips into granules and then vibrating-sieving to get PET composite masterbatch; and step of foam molding: feeding the PET composite material masterbatch into a mold to obtain the foamed shoe material through foam forming technology.

According to the embodiments of the present invention, the structure of the r-PET can be shown in equation (1) as follows:

Equation (1)

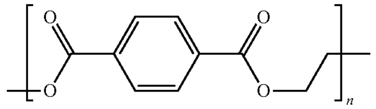

wherein the molar range of n increases with the increase of the molecular weight of the r-PET, and the intrinsic viscosity (IV) of the r-PET also increases with the increase of the molecular weight of the r-PET. Therefore, there is a positive correlation between the molar range of n and the intrinsic viscosity of the r-PET. In one of the embodiments, the molecular weight of equation (1) can be within the molecular weight range when the intrinsic viscosity of r-PET is greater than or equal to 0.7 dL/g. Preferably, n in equation (1) can be equal to or greater than 100 moles ($n \geq 100$ moles).

In one of the embodiments, taking the total weight of materials as 100 wt %, the content of r-PET is 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt % 49 wt %, 50 wt %, 51 wt %, 52 wt %, 53 wt %, 54 wt %, 55 wt %, 56 wt %, 57 wt %, 58 wt %, 59 wt %, 60 wt %, 61 wt % 62 wt %, 63 wt %, 64 wt %, or 65 wt %; The content of r-PET can be within the range defined by any two values mentioned above, but is not limited thereto.

In one of the embodiments, the intrinsic viscosity (IV) of the r-PET ranges from 0.6 dL/g to 1.0 dL/g. Preferably, the intrinsic viscosity of the r-PET is greater than or equal to 0.7 dL/g (IV≥0.7 dL/g). More preferably, the intrinsic viscosity of the r-PET can be 0.6 dL/g, 0.7 dL/g, 0.8 dL/g, 0.9 dL/g, or 1.0 dL/g; The intrinsic viscosity of this r-PET can be within the range defined by any two values mentioned above, but is not limited thereto.

According to the embodiments of the present invention, the r-PET can be made from discarded PET bottles. When the r-PET is made from discarded PET bottles, it is made of the polyethylene terephthalate recycled material (r-PET) through a known PET bottle recycling technology. Specifically, the method for processing the discarded PET bottles includes crushing, washing, separation, and drying; Among them, the crushing step involves chopping the material into small fragments, followed by removing a small amount of original material residue, such as shredded paper labels and plastic covers, from these fragments by suitable methods, washing, separating, and drying, and ultimately producing pure PET fragments or PET flakes, forming the recycled PET (r-PET) of the present invention.

According to the embodiment of the present invention, the structure of the EVA can be shown in equation (2) as follows:

Equation (2)

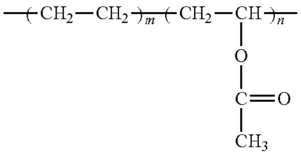

Wherein when the total sum of m and n is 100 mol %, m can range from 60 mol % to 84 mol %, and n can range from 16 mol % to 40 mol %.

Preferably, when the total sum of m and n is 100 mol %, m can be 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, 80 mol %, 81 mol %, 82 mol %, 83 mol %, or 84 mol %; M can be within the range defined by any two values mentioned above, but is not limited thereto.

Preferably, when the total sum of m and n is 100 mol %, n can be 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, or 40 mol %; N can be within the range defined by any two values mentioned above, but is not limited thereto.

In one of the embodiments, taking a total weight of materials as 100 wt %, the content of the EVA can be 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt % 54 wt %, 55 wt %, 56 wt %, 57 wt %, 58 wt %, 59 wt %, 60 wt %, 61 wt %, 62 wt %, 63 wt %, 64 wt %, 65 wt %, 66 wt % 67 wt %, 68 wt %, 69 wt %, or 70 wt %; The content of EVA can be within the range defined by any two values mentioned above, but is not limited to this.

In one of the embodiments, the EVA has a vinyl acetate (VA) content ranging from 8 wt % to 40 wt %; Among them, the vinyl acetate (VA) content of the EVA can be 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %. 35 wt %, 36 wt %, 37 wt %, 38 wt %, 39 wt %, 40 wt %; The vinyl acetate content of this EVA can be within the range defined by any two values mentioned above, but is not limited thereto.

In one of the embodiments, the melt flow rate (MFR) of the EVA is between 1 g and 10 g per 10 minutes at 190° C./2.16 kg, wherein the melt flow rate (MFR) of the EVA is 1 g, 2 g, 3 g, 4 g, 5 g, 6 g, 7 g, 8 g, 9 g or 10 g per 10 minutes at 190° C./2.16 kg; The melt flow rate of the EVA can be within the range defined by any two values mentioned above, but is not limited thereto.

According to the embodiment of the present invention, the compatibilizer can be an ethylene copolymer functionalized by a polar group. Preferably, the ethylene copolymer can be selected from ethylene ALPHA olefin copolymer, ethylene acrylate copolymer, or ethylene vinyl acetate copolymer (EVA); Wherein, the ethylene acrylate copolymer can be further selected from ethylene methyl acrylate copolymer, ethylene Ethyl acrylate copolymer or ethylene n-butyl acrylate copolymer. Preferably, the polar group can be selected from either the epoxy group or the anhydride group; more preferably, the polar group is glycidyl methacrylate (GMA) in the epoxy group.

In one of the embodiments, the compatibilizer can be an ethylene copolymer functionalized with glycidyl methacrylate (GMA) and prepared through grafting or copolymerization. In another embodiment, the compatibilizer can be a functionalized ethylene copolymer of glycidyl methacrylate (GMA) obtained through grafting reaction; Preferably, the GMA functionalized ethylene copolymer prepared by grafting reaction can be commercially obtained, and specific product names/models may include but are not limited to ARKEMA/Lottarder AX8840 and ARKEMA/Lottarder AX8900. In another embodiment, the compatibilizer can be a GMA-functionalized ethylene copolymer prepared through a copolymerization reaction; Preferably, the GMA-functionalized ethylene copolymer prepared by copolymerization can be commercially obtained, and specific product names/models may include but are not limited to NOF corporation/MODIPER A4400, Osaka Gas Chemical/MARICOM.

In one of the embodiments, the compatibilizer can be an epoxidized ethylene vinyl acetate copolymer, which is a graft copolymer obtained by grafting hydrogen atoms on the EVA chain with group containing an epoxy group, also known as epoxidized EVA. Preferably, the group containing an epoxy group can be glycidyl methacrylate (GMA), and the hydrogen atoms on the EVA chain undergo a grafting reaction with the epoxy groups on the glycidyl methacrylate (GMA) to obtain a graft copolymer of EVA-g-GMA.

In one of the embodiments, the epoxy content of the compatibilizer can be 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, or 16 mol %, calculated based on total mol % of the compatibilizer; The epoxy content of this EVA-g-GMA can be within the range defined by any two values mentioned above, but is not limited thereto.

According to the embodiment of the present invention, the structure of the compatibilizer can be shown in equation (3) as follows:

Equation (3)

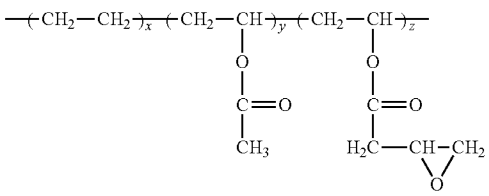

When the total sum of x, y, and z is 100 mol %, x can range from 45 mol % to 80 mol %, y can range from 5 mol % to 30 mol %, and z can range from 5 mol % to 26 mol %.

Preferably, when the total sum of x, y, and z is 100 mol %, x can be 45 mol %, 46 mol %, 47 mol %, 48 mol %, 49 mol %, 50 mol %, 51 mol %, 52 mol %, 53 mol %, 54 mol %, 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol % or 80 mol %; X can be within the range defined by any two values mentioned above, but is not limited thereto.

Preferably, when the total sum of x, y, and z is 100 mol %, y can be 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, or 30 mol %; Y can be within the range defined by any two values mentioned above, but is not limited thereto.

Preferably, when the total sum of x, y, and z is 100 mol %, z can be 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, or 26 mol %; Z can be within the range defined by any two values mentioned above, but is not limited thereto.

In one of the embodiments, the content of the compatibilizer can be 2 wt %, 3 wt %, 4 wt %, 5 wt %, 6 wt %, 7 wt %, 8 wt %, 9 wt %, or 10 wt %, calculated based on total weight of 100 wt % of the material; The content of the compatibilizer can be within the range defined by any two values mentioned above, but is not limited thereto.

In one of the embodiments, in the melting step, and during the process of extruding the polymer alloy with the twin-screw extruder, the polymer alloy, starting from the feeding process, is sequentially heated at temperatures of 160° C., 180° C., 190° C., 200° C., 220° C., 230° C., 240° C., 245° C., 240° C., and 235° C.

For the technology, means and other effects of the invention used to achieve the above objectives, the best feasible embodiment is given and illustrated in detail with the drawings below.

BRIEF DESCRIPTION OF THE DRAWINGS

No drawing.

DETAILED DESCRIPTION

In order to facilitate the understanding of the present invention, the following will be explained in conjunction with embodiments.

Some embodiments of the features and advantages of the present invention will be described in detail in the following description. It should be understood that the present invention can have various variations in different modes, but none of them fall outside the scope of the present invention, and the explanations therein are essentially intended as illustrative in nature rather than limiting the present invention.

In the preparation method of the foamed shoe material provided by the present invention, the materials include recycled polyethylene terephthalate (r-PET), ethylene vinyl acetate copolymer (EVA), and compatibilizer; Taking the total weight of the composite material masterbatch as 100 wt %, the content of the r-PET ranges from 25 wt % to 65 wt %, the content of the EVA ranges from 30 wt % to 70 wt %, the content of the compatibilizer ranges from 2 wt % to 10 wt %, and the compatibilizer is epoxidized EVA with an epoxy content of 3 mol % to 16 mol %.

In the embodiment of the present invention, the r-PET is a recycled material of polyethylene terephthalate made from recycled PET bottles; The r-PET is a PET material with an intrinsic viscosity (IV) of 0.6 dL/g to 1.0 dL/g.

In the embodiment of the present invention, the EVA is a vinyl acetate (VA) content ranging from 8 wt % to 40 wt %, and the melt mass flow rate (MFR) of the EVA is 1 to 10 grams per 10 minutes (1 g/10 min to 10 g/10 min) at 190° C./2.16 kg.

In the preparation method of the foamed shoe material of the present invention, r-PET and EVA are subjected to etherification and/or esterification by adding epoxidized EVA (compatibilizer) to achieve material modification, so that r-PET is well compatible with EVA to form a polymer alloy for preparing masterbatches for future use.

According to the embodiment of the present invention, r-PET is made from discarded PET bottles or plastic bottles. PET is a polyester plastic produced by the condensation reaction of terephthalic acid and ethylene glycol. In the condensation reaction process, the terephthalic acid part of each monomer has two carboxylic groups (—COOH), while the ethylene glycol part has two hydroxyl groups (—OH), and some of the carboxylic groups and hydroxyl groups react to form ester bonds to form PET. Therefore, based on the specific process conditions of PET products, which functional group is left more in the PET polycondensation process will determine whether the end functional group of PET is carboxyl or hydroxyl. In one embodiment of the invention, the r-PET includes a recycled PET with a carboxyl and/or hydroxyl as the end functional group.

The following equation (4) shows the structure of the polymer alloy formed by etherification of r-PET and EVA after adding epoxidized EVA (compatibilizer). Among them, the end functional groups remaining after the r-PET reaction are carboxyl groups:

Equation (4)

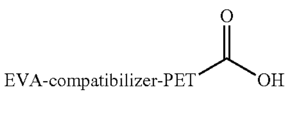

The following equation (5) shows the structure of the polymer alloy formed by the esterification of r-PET and EVA after adding epoxidized EVA (compatibilizer). Among them, the remaining end functional groups after the r-PET reaction are hydroxyl groups:

Equation (5)

HO—PET-compatibilizer-EVA

The following equation (I) shows the mechanism of etherification between r-PET and epoxidized EVA (compatibilizer). The etherification compound of the following equation (4-1) is generated through equation (I), and has an EVA-affinitive and PET-affinitive end group:

Reaction Equation (I)

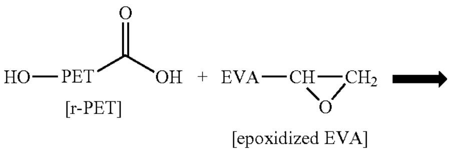

-continued

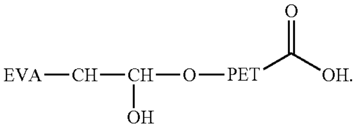

[Equation (4-1): esterification compound]

Equation (4-1)

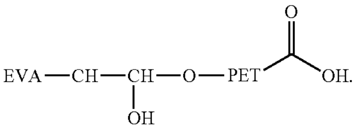

The reaction mechanism for compatibilizing the etherification compound of equation (4-1) with EVA and r-PET is shown in reaction equation (II); Thus, the EVA-affinitive and PET-affinitive end groups of etherification compounds are bonded to EVA and r-PET, respectively, to form a good compatibility state between EVA and r-PET.

Reaction Equation (II)

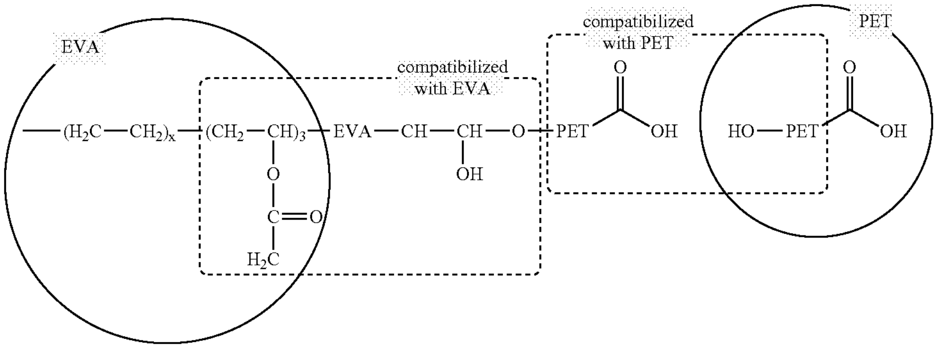

[EVA] [Etherification compoud] [r-PET]

The following reaction equation (III) shows the mechanism of esterification between r-PET and epoxidized EVA (compatibilizer). The esterification compound of the below equation (5-1) is generated through reaction equation (III), and has a EVA-affinitive end group and a PET-affinitive end group:

Reaction Equation (III)

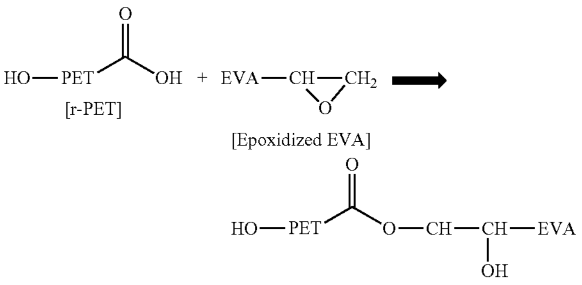

[r-PET] [Epoxidized EVA]

[Equation (5-1): Esterification compound]

The reaction mechanism for compatibilizing the esterification compound of equation (5-1) with EVA and r-PET is shown in equation (IV), so that, by using the EVA and r-PET end groups of the esterification compound, they are bonded to EVA and r-PET, respectively, to form a good compatibility state between EVA and r-PET.

Reaction Equation (IV)

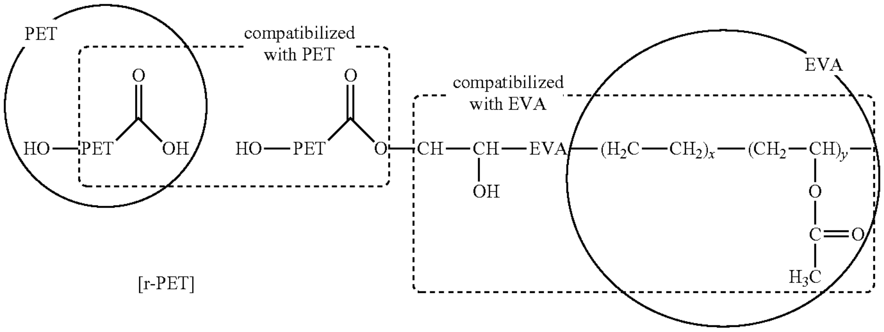

[r-PET] [Esterification compound] [EVA]

The above explains the equation of the composite material masterbatch of r-PET and EVA, and the reaction mechanism of material melting and mixing compatibility in the preparation method of the foamed shoe material of the present invention. The following describes the specific implementation method of the production method of the foamed shoe material of the present invention.

The material ratio composition of the foamed shoe material of the present invention is shown in embodiments 1 to 4 of Table 1 below.

Table 1 shows the r-PET, EVA, and compatibilizer contents in embodiments 1 to 4 when the total amount of composite material masterbatch is 100 wt %.

| embodiment | Content of r-PET | Content of EVA | Content of compatilizer |
|---|---|---|---|
| 1 | 25 | 70 | 5 |
| 2 | 25 | 65 | 10 |
| 3 | 65 | 30 | 5 |
| 4 | 65 | 25 | 10 |

A method for making foamed shoe material of the present invention includes the following steps:

Step of picking Material: Providing ethylene vinyl acetate copolymer (EVA), epoxidized EVA (compatibilizer), and recycled PET (r-PET) prepared from recycled PET bottles in any of the embodiments 1 to 4;

Step of melting: Using a weightless metering system, EVA, epoxidized EVA, and PET are proportionally and respectively fed to form a polymer alloy, extruding, by a twin-screw extruder at a temperature of 160° C. to 245° C. and an average shear rate of 100/sec to 300/sec, the polymer alloy into strips at a rate of 100 kg/hr to 250 kg/hr, while controlling the screw within the aforementioned temperature range during the extruding process of the polymer alloy, starting from the feeding process, the polymer alloy is sequentially heated at temperatures of 160° C., 180° C., 190° C., 200° C., 220° C., 230° C., 240° C., 245° C., 240° C., and 235° C. in a staged heating manner where the polymer alloy is heated first and then cooled;

Step of semi-finished product strip drawing: Controlling the twin-screw extruder to draw out the polymer alloy strip that has been extruded into strips, and guide the polymer alloy strips to cool through a water channel;

Step of cutting and granulation: controlling the twin-screw extruder to cut the cooled polymer alloy strips into granules and then vibrating-sieving to get the composite masterbatch;

Step of foam mold fine tuning: adjusting the length, width, and/or thickness (i.e. shoe material height) of the foam mold cavity based on the preset shoe material size, where the fine tuning range for length is 5 mm to 10 mm, width is 5 mm to 10 mm, and thickness is 10 mm to 20 mm;

Step of foam molding: mixing the composite material masterbatch with EVA and elastic materials, and then inject them into the mold to obtain the foamed shoe material through foam forming technology.

In the embodiment of the present invention, in the step of melting, during the process of extruding the polymer alloy using the screw, and starting from the feeding process, the polymer alloy is sequentially heated at temperatures of 160° C., 180° C., 190° C., 200° C., 220° C., 230° C., 240° C., 245° C., 240° C., and 235° C. in a staged heating manner where the polymer alloy is heated first and then cooled. Through the control of the aforementioned temperature heating section, it is ensured that r-PET and EVA are reacted with epoxidized EVA to achieve the aforementioned reaction equations (I), (II), and/or reaction equations (III), (IV) in the melting section before reaching the cracking temperature (about 250° C. to 270° C.), to prevent EVA from cracking first and generating epoxy ring opening self polymerization reaction with epoxidized EVA, causing the inability of r-PET and EVA to form a uniform polymer alloy and damaging the foam uniformity of the recycled PET composite material masterbatch used for shoe material preparation.

In the embodiment of the present invention, the preparation method of the foamed shoe material also includes a collecting and bagging step after the cutting and granulation step, which is to collect and bag the screened granular polymer alloy (i.e. the composite material masterbatch).

What is claimed is:

1. A method for making foamed shoe material comprising:

step of picking material: taking a total weight of materials as 100 wt %, providing 25 wt % to 65 wt % recycled polyethylene terephthalate (r-PET), 30 wt % to 70 wt % ethylene vinyl acetate copolymer (EVA), and 2 wt % to 10 wt % compatibilizer; wherein the r-PET is a recycled material made from recycled polyethylene terephthalate (PET) bottles, and the compatibilizer is a polymer material or a grafted polymer material with epoxy content ranging from 3 mol % to 16 mol %;

step of melting: using a weightless metering system, the EVA, compatibilizer, and PET are proportionally and respectively fed to form a polymer alloy, extruding, by a twin-screw extruder at a temperature of 160° C. to 245° C. and an average shear rate of 100/sec to 300/sec, the polymer alloy into strips at a rate of 100 kg/hr to 250 kg/hr, while controlling the screw within the aforementioned temperature range during the extruding process of the polymer alloy, starting from feeding process, and heating the polymer alloy from temperature of 160° C. to 245° C., and then cooling it down to less than 240° C. during the process of extruding the polymer alloy with the twin-screw extruder;

step of semi-finished product strip drawing: controlling the twin-screw extruder to draw out the polymer alloy strip that has been extruded into strips, and guide the polymer alloy strips to cool through a water channel;

step of cutting and granulation: controlling the twin-screw extruder to cut the cooled polymer alloy strips into granules and then vibrating-sieving to get PET composite masterbatch; and step of foam molding: mixing the PET composite material masterbatch with EVA and an elastic material, injecting the mixture into a foam mold cavity, and obtaining the foamed shoe material by foam molding.

2. The method for making foamed shoe material as claimed in claim 1, wherein in the melting step, and during the process of extruding the polymer alloy with the twin-screw extruder, the polymer alloy, starting from the feeding process, is sequentially heated at temperatures of 160° C., 180° C., 190° C., 200° C., 220° C., 230° C., 240° C., 245° C., 240° C., and 235° C.

3. The method for making foamed shoe material as claimed in claim 1, wherein the compatibilizer is an ethylene copolymer functionalized by a polar group.

4. The method for making foamed shoe material as claimed in claim 3, wherein the ethylene copolymer is selected from a group consisting of ethylene-alpha-olefin copolymer, ethylene-propionate copolymer, and ethylene vinyl acetate copolymer (EVA).

5. The method for making foamed shoe material as claimed in claim 4, wherein the ethylene-propionate copolymer is selected from a group consisting of ethylene-methyl acrylate copolymer, ethylene-ethyl acrylate copolymer and ethylene-n-butyl acrylate copolymer.

6. The method for making foamed shoe material as claimed in claim 3, wherein the polar group is epoxide group or anhydride group.

7. The method for making foamed shoe material as claimed in claim 6, wherein the polar group is glycidyl methacrylate (GMA) in the epoxy group.

8. The method for making foamed shoe material as claimed in claim 1, wherein the compatibilizer is an ethylene copolymer functionalized with glycidyl methacrylate (GMA).

9. The method for making foamed shoe material as claimed in claim 1, wherein the compatibilizer is an epoxidized ethylene vinyl acetate copolymer (EVA-g-GMA).

10. The method for making foamed shoe material as claimed in claim 1, wherein an Intrinsic Viscosity (IV) of the r-PET ranges from 0.6 dL/g to 1.0 dL/g.

11. The method for making foamed shoe material as claimed in claim 1, wherein a vinyl acetate (VA) content of the EVA ranges from 8 wt % to 40 wt %, and a melt flow rate (MFR) of the EVA ranges from 1 g to 10 g every 10 minutes at 190° C./2.16 kg.

* * * * *